United States Patent
Yu et al.

(10) Patent No.: US 11,122,485 B2
(45) Date of Patent: *Sep. 14, 2021

(54) METHOD AND APPARATUS FOR MOBILITY MANAGEMENT

(71) Applicant: HUAWEI TECHNOLOGIES CO., LTD., Guangdong (CN)

(72) Inventors: Yinghui Yu, Beijing (CN); Weiwei Song, Shenzhen (CN); Yajun Zhao, Shenzhen (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 19 days.

This patent is subject to a terminal disclaimer.

(21) Appl. No.: 13/973,017

(22) Filed: Aug. 22, 2013

(65) Prior Publication Data

US 2013/0343342 A1 Dec. 26, 2013

Related U.S. Application Data

(63) Continuation of application No. 13/195,462, filed on Aug. 1, 2011, now Pat. No. 8,538,436, which is a
(Continued)

(51) Int. Cl.
*H04W 36/16* (2009.01)
*H04W 36/00* (2009.01)

(52) U.S. Cl.
CPC ..... *H04W 36/165* (2013.01); *H04W 36/0061* (2013.01)

(58) Field of Classification Search
CPC ........................ H04W 36/165; H04W 36/0061
(Continued)

(56) References Cited

U.S. PATENT DOCUMENTS 6,131,029 A * 10/2000 Roberts .................. 455/438
7,046,648 B2 5/2006 Zhang et al.
(Continued)

FOREIGN PATENT DOCUMENTS

CN 1522093 8/2004
CN 1802002 7/2006
(Continued)

OTHER PUBLICATIONS

Partial translation of CN 101267661 A (Reference AS in the IDS filed Aug. 22, 2013).
(Continued)

*Primary Examiner* — Hassan Kizou
*Assistant Examiner* — Abdullahi Ahmed
(74) *Attorney, Agent, or Firm* — Leydig, Voit & Mayer, Ltd.

(57) ABSTRACT

A method for mobility management, an apparatus and a User Equipment (UE) are disclosed. The method includes: obtaining cell set information sent by a cell set in an access network; selecting a target cell set to which a UE may hand over according to the cell set information, and sending information about selection of the target cell set to the target cell set; and receiving information about at least one target cell decided by the target cell set, and providing the information about the target cell to the UE for handover. The method for mobility management between cell sets simplifies mobility management in multi-cell communication and improves performance of the communication system.

19 Claims, 11 Drawing Sheets

Related U.S. Application Data continuation of application No. PCT/CN2009/070331, filed on Feb. 2, 2009.

(58) Field of Classification Search
USPC .................................................. 370/331
See application file for complete search history.

(56) References Cited

U.S. PATENT DOCUMENTS

| | | | |
|---|---|---|---|
| 7,239,870 | B2 | 7/2007 | Zhang et al. |
| 7,885,235 | B2 | 2/2011 | Mochizuki et al. |
| 2003/0035393 | A1* | 2/2003 | Sinnarajah et al. .......... 370/335 |
| 2003/0232631 | A1* | 12/2003 | Ohmori .................. H04W 8/18 455/552.1 |
| 2004/0162072 | A1 | 8/2004 | Sigle et al. |
| 2004/0202131 | A1* | 10/2004 | An et al. ....................... 370/331 |
| 2006/0068789 | A1 | 3/2006 | Vannithamby et al. |
| 2006/0271551 | A1 | 11/2006 | Suojasto |
| 2007/0015514 | A1 | 1/2007 | Bishop |
| 2008/0102834 | A1* | 5/2008 | Bernhard .......... H04W 36/0085 455/436 |
| 2008/0167041 | A1 | 7/2008 | Wang et al. |
| 2008/0176566 | A1* | 7/2008 | Akita ............................. 455/436 |
| 2008/0232323 | A1* | 9/2008 | Jeong ............... H04W 72/0406 370/331 |
| 2008/0293394 | A1* | 11/2008 | Silver .................. H04W 36/24 455/417 |
| 2009/0042572 | A1* | 2/2009 | Craig .................. H04W 36/28 455/436 |
| 2009/0046573 | A1 | 2/2009 | Damnjanovic |
| 2009/0117909 | A1* | 5/2009 | Kim .................. H04W 36/0033 455/442 |
| 2009/0310563 | A1* | 12/2009 | Chou .................. H04L 27/0006 370/331 |
| 2009/0316659 | A1* | 12/2009 | Lindoff ................ H04J 11/0069 370/332 |
| 2010/0069071 | A1 | 3/2010 | Simonsson et al. |
| 2010/0216473 | A1 | 8/2010 | Kazmi et al. |
| 2011/0080825 | A1* | 4/2011 | Dimou ................. H04J 11/0086 370/216 |
| 2011/0081940 | A1* | 4/2011 | Gerstenberger ...... H04W 52/54 455/522 |
| 2011/0176448 | A1* | 7/2011 | Rezaiifar et al. ............. 370/252 |

FOREIGN PATENT DOCUMENTS

| | | |
|---|---|---|
| CN | 1832616 A | 9/2006 |
| CN | 1984434 | 6/2007 |
| CN | 101159959 | 4/2008 |
| CN | 101170793 | 4/2008 |
| CN | 101267661 | 9/2008 |
| CN | 101547486 | 9/2009 |
| EP | 1448010 | 8/2004 |
| EP | 1448010 A1 * | 8/2004 |
| EP | 1 686 821 A1 | 8/2006 |
| WO | WO03/005759 | 1/2003 |
| WO | 2008/031258 A1 | 3/2008 |
| WO | 2008/042906 A2 | 4/2008 |
| WO | 2008/086647 A1 | 7/2008 |
| WO | WO2009/117935 | 10/2009 |

OTHER PUBLICATIONS

3rd Generation Partnership Project; Technical Specification Group Radio Access Network; Evolved Universal Terrestrial Radio Access (E-UTRA) Radio Resource Control (RRC); Protocol Specification (Release 8), 3GPP TS 36.331 V8.4.0, Dec. 2008, pp. 1-198.
"R1-090382: Anchor component carrier", Document of *3GPP TSG-RAN1 #55bis*, Jan. 12-16, 2008, 2 pp., Fujitsu, Ljubljana, Slovenia.
"R1-082575: Proposals for LTE-Advanced Technologies", PowerPoint presentation of *3GPP TSG RAN WG1 Meeting #53bis*, Jun. 30-Jul. 4, 2008, 36 pp., NTT DoCoMo, Inc., Warsaw, Poland.
European Notice of Opposition dated Sep. 3, 2014, in corresponding European Patent Application No. 09839058.6.
Written Opinion of the International Searching Authority from the Chinese Patent Office in International Application No. PCT/CN2009/070331 dated Nov. 5, 2009.
International Search Report from the Chinese Patent Office in International Application No. PCT/CN2009/070331 dated Nov. 5, 2009.
Office Action, dated Jan. 19, 2012, in corresponding U.S. Appl. No. 13/195,462.
Supplementary European Search Report dated Nov. 3, 2011, issued in related Application No. 09839058.6-2412, PCT/CN2008/070331, Huawei Technologies Co., Ltd.
3GPP TSG RAN WG1#53bis, "Carrier aggregation in Advanced E-UTRA", Agenda: 12. Study Item on LTE-Advanced, Source: Huawei, Document for: Discussion/Decision, R1-082448, Warsaw, Poland, Jun. 30-Jul. 4, 2008.
Zhang et al., "BPA—A Parallel Shortest Path Algorithm for Cluster-Router", Proceedings of the 18th IASTED International Conference Parallel and Distributed Computing Systems, Nov. 13-15, 2006, Dallas, TX, USA.
3GPP TSG RAN WG2 Meeting #66bis, "Handover for Carrier Aggregation", Source: CATT, Agenda Item: 7.3, Document for: Discussion and Decision, R2-093722, Los Angeles, USA, Jun. 29-Jul. 3, 2009.
Office Action, dated Oct. 26, 2012, in corresponding U.S. Appl. No. 13/195,462.
Notice of Allowance, dated May 21, 2013, in corresponding U.S. Appl. No. 13/195,462.
Notice of Allowability, dated Jun. 17, 2013, in corresponding U.S. Appl. No. 13/195,462.
Chinese Office Action and Search Report dated Jul. 27, 2015 in corresponding Chinese Patent Application No. 201310317823.2.
"Change Request", 3GPP TSG-GERAN Meeting #29, GP-060742, San Jose Del Cabo, Mexico, Apr. 24-28, 2006, 57 pp.
"Change Request", 3GPP TSG RAN WG3 Meeting #59, R3-080329, Feb. 11-15, 2008, Sorrento, Italy, 8 pp.
Office Action dated Jul. 20, 2015 for Chinese Patent Application No. 201310316346.8.
Chinese Allowed (2016031400122400) dated Mar. 17, 2016 in corresponding Chinese Patent Application No. 201310317823.2.
Chinese Allowed (2016030301323360) dated Mar. 17, 2016 in corresponding Chinese Patent Application No. 201310317823.2.
Chinese Search Report dated Mar. 3, 2016 in corresponding Chinese Patent Application No. 2013103178232.
3GPP TS 36.423 V8.4.0 (Dec. 2008), 3rd Generation Partnership Project; Technical Specification Group Radio Access Network; Evolved Universal Terrestrial Radio Access Network (E-UTRAN); X2 application protocol (X2AP) (Release 8), Dec. 2008, pp. 1-89.
3GPP TS 36.300 V8.7.0 (Dec. 2008), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), Dec. 2008, pp. 1-144.
"COMP clarification of definitions and TP," 3GPP Draft RAN WGCI #54 bis, R1-083906, XP050317217, pp. 1-6, 3rd Generation Partnership Project—Valbonne, France (Oct. 6, 2008).
Extended European Search Report dated Jan. 14, 2016 in corresponding European Patent Application No. 15165466.2.
Various corrections to TS 43 129, 3GPP TSG-GERAN Meeting #29, GP-080742, San Jose Del Gabo, Mexico, Apr. 24-28, 2006, 57 pp.
PDCP SN handling 3GPP TSG RAN WG3 Meeting #59, R3-080329, Feb. 11-15, 2008, Sorrento, Italy, 8 pp.

\* cited by examiner

METHOD AND APPARATUS FOR MOBILITY MANAGEMENT

CROSS-REFERENCE TO RELATED APPLICATIONS

This application is a continuation of U.S. patent application Ser. No. 13/195,462, filed on Aug. 1, 2011, which is a continuation of International Application No. PCT/CN2009/070331, filed on Feb. 2, 2009, both of which are hereby incorporated by reference in their entireties.

FIELD OF THE INVENTION

The present invention relates to communications technologies, and in particular, to a method and an apparatus for mobility management.

BACKGROUND OF THE INVENTION

Mobile communication systems have evolved to the third generation (3G). The standards of Long Term Evolution (LTE) systems are now being developed in order to keep long-term competitiveness of the systems. Carrier aggregation is introduced into LTE Release 10(R10) to further improve spectrum efficiency and user throughput of the system. Carrier aggregation means that a UE can use multiple Component Carriers (CCs) simultaneously for uplink and downlink communication.

Carrier aggregation is categorized into symmetric carrier aggregation and asymmetric carrier aggregation depending on whether the number of carriers used in the uplink direction is the same as the number of carriers used in the downlink direction. Regardless of the aggregation mode, the UE may communicate with multiple CCs in uplink and downlink directions. Because the cell on each CC carries its own synchronization channel and broadcast channel, the UE using multiple CCs is equivalent to communicating with multiple cells.

Cells applied in a centralized geographic area are called "multiple centralized cells". A set of multiple centralized cells is a centralized cell set. FIG. 1 shows carrier aggregation of centralized cells. As shown in FIG. 1, four cells centralized in the geographic location (namely, under the same coverage) send signals through four CCs of different frequencies respectively. The UE communicates with the four cells by communicating with the four CCs.

To improve experience of edge users, a Coordinated Multi-Point transmission (CoMP) technology is introduced into the LTE R10. FIG. 2 shows principles of CoMP. As shown in FIG. 2, a UE may receive and send data through multiple cells. The cells may be distributed under the same evolved NodeB (eNB), or under different eNBs. To achieve the best uplink and downlink communication performance, the UE communicates with multiple different cells in the uplink and downlink directions. The multiple cells which are separated geographically are called "multiple distributed cells". The CoMP is a structure of multiple distributed cells. A set of multiple distributed cells is a distributed cell set.

After the centralized multi-cell structure represented by carrier aggregation and the distributed cell structure represented by CoMP are introduced, a concept of anchor cells is introduced in order to manage connections and share resources more efficiently. An anchor cell is a cell that sends Packet Data Control Channel (PDCCH) messages.

After CC and CoMP are introduced, the UE is served by multiple cells in much more scenarios. In the prior art, when a UE communicates with multiple cells, each cell manages mobility for the UE separately, which is rather complicated in maintaining the mobility performance, especially when the UE communicates with different cell sets in uplink and downlink directions.

SUMMARY OF THE INVENTION

The embodiments of the present invention provide a method for mobility management, an apparatus for mobility management and a UE.

A method for mobility management provided in an embodiment of the present invention includes: obtaining cell set information sent by a cell set in an access network; selecting, for a UE, a target cell set to which the UE may hand over according to the cell set information, and sending information about selection of the target cell set to the target cell set; and receiving information about at least one target cell decided by the target cell set, and providing the information about the target cell to the UE for handover.

An apparatus for mobility management provided in an embodiment of the present invention includes: a cell set information obtaining unit, configured to obtain cell set information sent by a cell set in an access network; a target cell set selecting unit, configured to select, for a UE, a target cell set to which the UE may hand over according to the cell set information, and send information about selection of the target cell set to the target cell set; and a handover information forwarding unit, configured to receive information about at least one target cell decided by the target cell set, and provide the information about the at least one target cell to the UE for handover.

Another method for mobility management provided in an embodiment of the present invention includes: judging whether a UE needs to change a connected cell according to radio resource conditions of an access network or cell signal measurement information from the UE; sending a resource reallocation message that carries information about a target cell to the UE through a source cell when the UE needs to change the connected cell; and sending control information to the UE through a control channel of the source cell and/or the target cell after sending the resource reallocation message.

Another apparatus for mobility management provided in an embodiment of the present invention includes: a cell change judging unit, configured to judge whether a UE needs to change a connected cell according to radio resource conditions of an access network or cell signal measurement information from the UE; a resource reallocation message sending unit, configured to send a resource reallocation message that carries information about a target cell to the UE through a source cell when the UE needs to change the connected cell; and a handover control unit, configured to send control information to the UE through a control channel of the source cell and/or the target cell after sending the resource reallocation message.

A UE provided in an embodiment of the present invention includes: a resource reallocation message receiving unit, configured to receive a resource reallocation message that carries information about a target cell from a source cell; a handover executing unit, configured to stop receiving control information from a control channel of the source cell and receive control information from a control channel of the target cell after receiving the resource reallocation message from the source cell; and a resource reallocation completion message sending unit, configured to send a resource reallocation completion message to the target cell after resource reallocation is completed.

Another UE provided in an embodiment of the present invention includes: a resource reallocation message receiving unit, configured to receive a resource reallocation message that carries information about a target cell from a source cell; a handover executing unit, configured to receive control information from a control channel of the target cell after receiving the resource reallocation message from the source cell, and stop receiving control information from a control channel of the source cell when control information from the target cell is received; and a resource reallocation completion message sending unit, configured to send a resource reallocation completion message to the target cell after resource reallocation is completed.

The method for mobility management disclosed herein selects, for the UE, a target cell set to which the UE may hand over according to the received cell set information, and determines the target cell of handover according to decision of the target cell set. In this way, the handover between cell sets is implemented. In the embodiments of the present invention, a method for mobility management, an apparatus and a UE are provided for communication between multiple cells to simplify mobility management in multi-cell communication and improve performance of the communication system.

DETAILED DESCRIPTION OF THE EMBODIMENTS

The embodiments of the present invention are detailed below with reference to the accompanying drawings.

The embodiments of the present invention provide a method and an apparatus for mobility management between cell sets. An access network includes multiple cell sets. The access network generates a cell set according to resource conditions of the access network, or assigns the cell set according to service conditions of the UE. Therefore, the cell set may be static, or change dynamically. A cell set may belong to one or more access network nodes, and one or more cell sets may belong to the same access network node. The UE in an embodiment of the present invention selects a target cell set of handover through a source cell or a source cell set, and the selected target cell set decides a target cell to which the UE may hand over.

Figure 1:
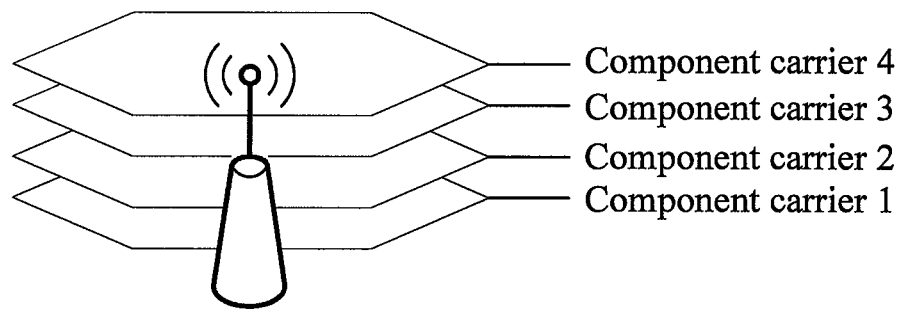
FIG. 1 shows carrier aggregation of centralized cells in the prior art.
Figure 2:
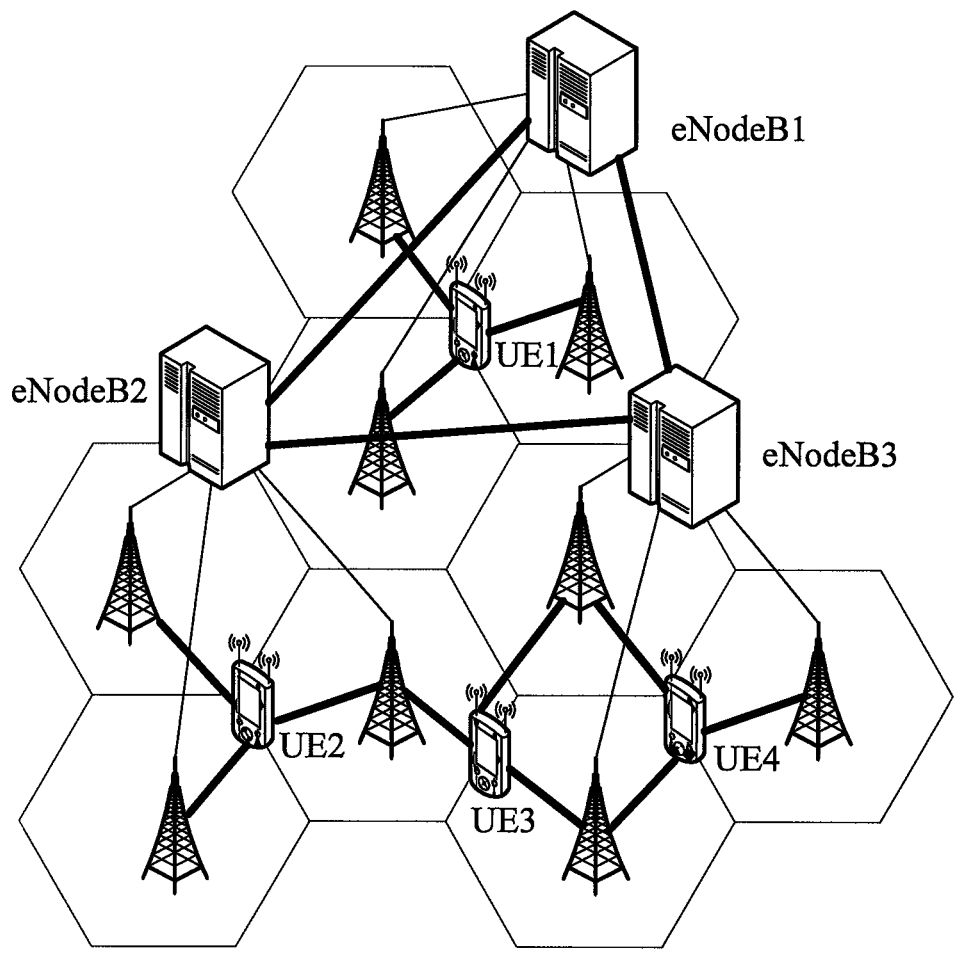
FIG. 2 shows principles of CoMP in the prior art.
Figure 3:
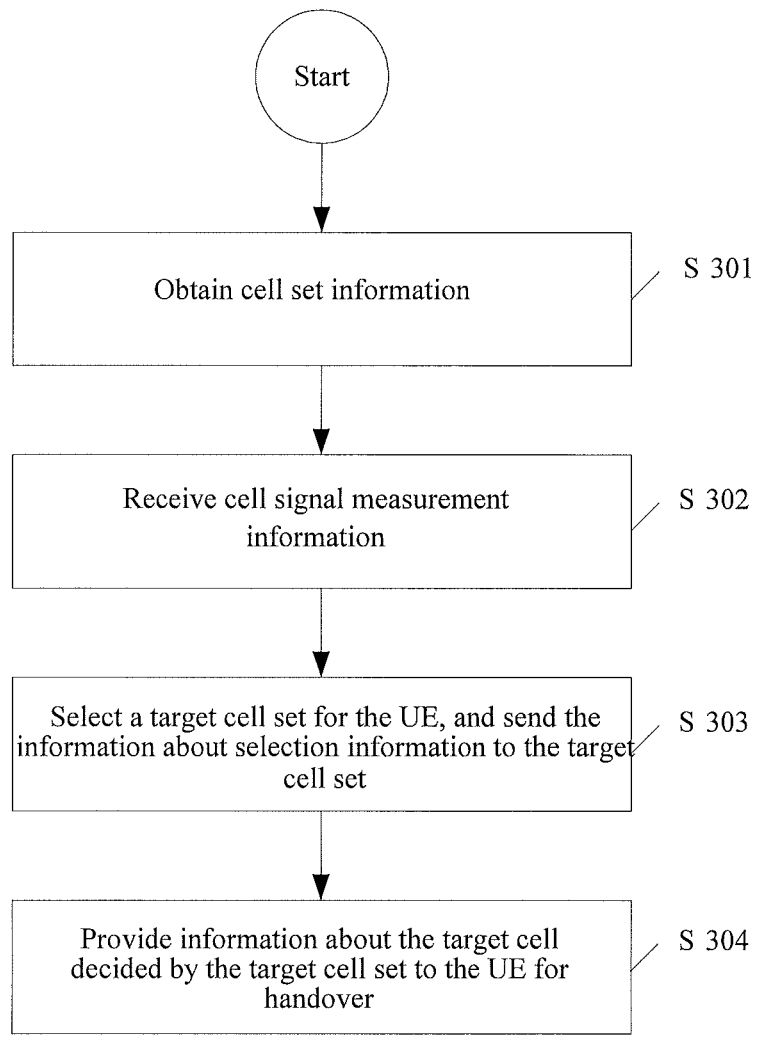
FIG. 3 is a flowchart of a method for mobility management between cell sets in an embodiment of the present invention.

FIG. 3 is a flowchart of a method for mobility management between cell sets in an embodiment of the present invention. As shown in FIG. 3, the method includes the following steps:

Step S301: Obtain cell set information sent by a cell set in an access network.

Cell set information needs to be exchanged between the cell sets of the access network in order to select a target cell set of handover properly. The information is exchanged through broadcast or unicast, and sent periodically or sent as triggered by an event. Cell set information includes: an identifier (ID) of a cell set, and component cell information of the cell set. The component cell information includes: an ID of each cell, and a frequency. Component cell information that is optional is: an ID of an access network node to which component cells belong, public information of the cell or antenna configuration of each cell, a service direction, bandwidth, or information indicating whether the cell is an anchor cell. The service direction is uplink, downlink, or both uplink and downlink.

Step S302: Receive cell signal measurement information sent by the UE. This step is optional. When the UE finds that the signal quality is low and requests handover, the UE may send cell signal measurement information to the source cell.

Step S303: Select, for the UE, a target cell set to which the UE may hand over according to the cell set information and the cell signal measurement information, and send the information about selection of the target cell set to the target cell set. The information about selection may include: a cell set ID, IDs of all or part of the cells in the cell set, and signal measurement information that is obtained after the UE measures signals of all or part of cells in the cell set. Optionally, step S302 may be skipped when the source cell or cell set starts handover proactively due to resource requirements. In this case, according to the obtained cell set information, the source cell or the source cell set selects, for the UE, a target cell set to which the UE may hand over.

For example, a measurement report of the UE includes measurement results of 3 cells: cell 1, frequency 1, cell 2, frequency 2, cell 3, and frequency 3. The signal of cell 1 is a little stronger than the signal of cell 2 and cell 3, cell 1 is stand-alone, and cell 2 and cell 3 are in the same cell set. If the cell set information is not taken into account, the UE prefers cell 1 as a target cell; if the cell set is taken into account and the UE has large traffic, the UE prefers the cell set that includes cell 2 and cell 3 as a handover target.

In another example, the measurement report of the UE includes measurement results of 3 cells: cell 4, frequency 4, cell 5, frequency 5, cell 6, and frequency 6. The signal of cell 4 is a little stronger than the signal of cell 5 and cell 6, cell 4 is an independent cell set, and cell 5 and cell 6 belong to another cell set. If the cell set information is not taken into account, the UE prefers cell 4 as a target cell; if the cell set is taken into account and the UE has large traffic, the UE prefers the cell set that includes cell 5 and cell 6 as a handover target.

Step S304: Receive information about at least one target cell decided by the target cell set, and provide the information about the target cell to the UE for handover.

The target cell set needs to decide one or more target cells of the UE according to the information about selection and the resource occupation state of the target cell set, and then sends the information about the decided target cell to the UE for handover.

In an optional solution, when the target cell supports configuration of an anchor cell, the target cells decided by the target cell set may include the anchor cell. Alternatively, the anchor cell ID may be recommended by the source cell, and the target cell needs to meet a requirement of the source cell as far as possible when deciding the anchor cell. The target cell decides another target cell as anchor cell only if the anchor cell recommended by the anchor cell is incompetent (for example, the resources of the cell are totally occupied and the cell is accessible to no more UE).

Figure 4:
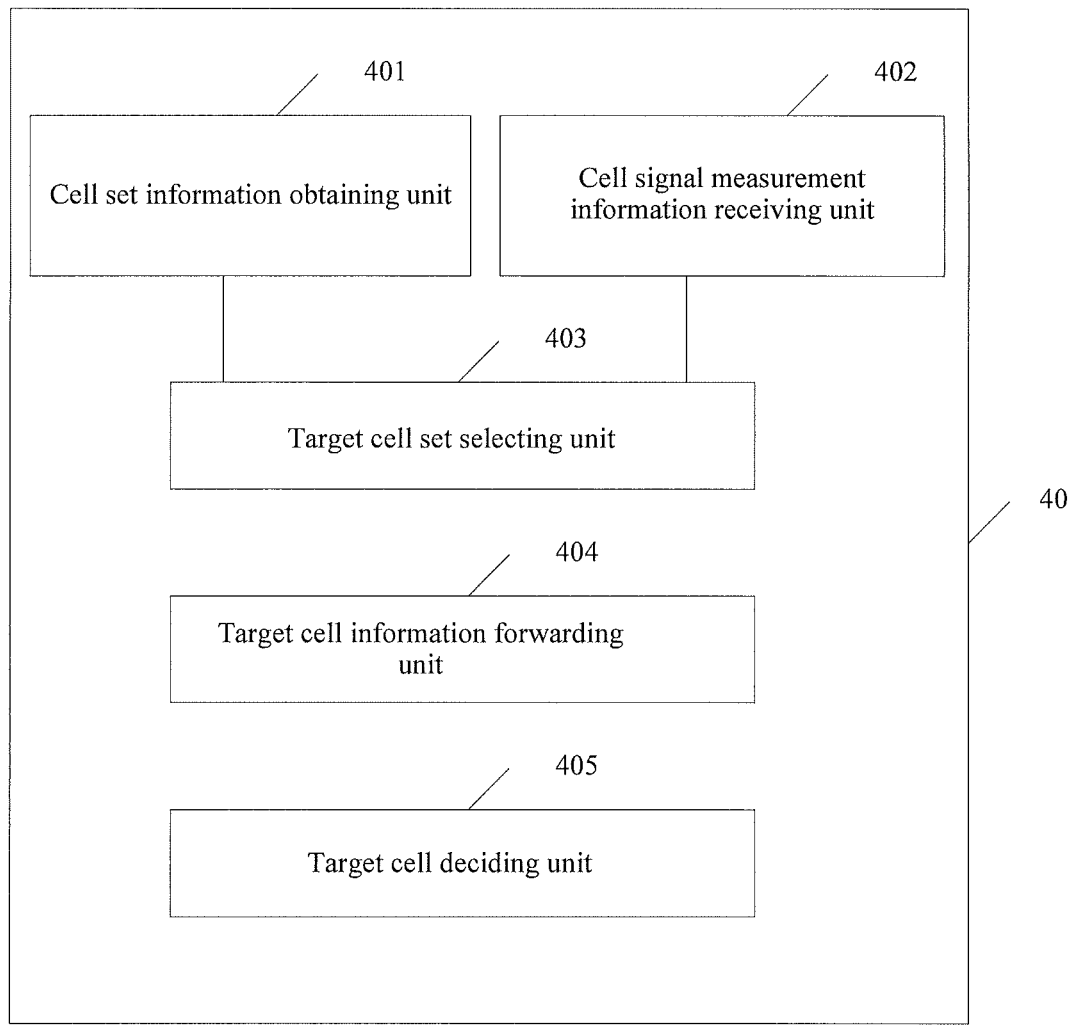
FIG. 4 is a block diagram of an apparatus for mobility management between cell sets in an embodiment of the present invention.

FIG. 4 is a block diagram of an apparatus for mobility management between cell sets in an embodiment of the present invention. The apparatus for mobility management may be an access network node (such as eNB) to which the cell set in the access network belongs. As shown in FIG. 4, the apparatus 40 includes: a cell set information obtaining unit 401, configured to obtain cell set information sent by a cell set in an access network; a cell signal measurement information receiving unit 402, configured to receive cell signal measurement information sent by the UE (this unit is optional, and can be omitted when the source cell or the source cell set starts the UE handover proactively due to resource deficiency); a target cell set selecting unit 403, configured to: select a target cell set to which the UE may hand over according to the cell set information, and optionally, according to the cell signal measurement information; and send information about selection of the target cell set to the target cell set (the information about selection includes: a cell set ID, IDs of all or part of the cells in the cell set, and optionally, signal measurement information obtained after the UE measures signals of all or part of the cells in the cell set); and a handover information forwarding unit 404, configured to receive information about at least one target cell decided by the target cell set, and provide the information about the at least one target cell to the UE for handover.

The apparatus 40 may further include: a target cell deciding unit 405, configured to: receive information about selection of the target cell set from the source cell or the source cell set, decide at least one target cell in the target cell set according to cell signal measurement information in the information about selection and resource occupancy of the target cell set, and forward information about the decided target cell to the UE through the source cell or the source cell set of the UE.

When the target cell set supports configuration of an anchor cell, the information about the target cell decided by the target cell deciding unit 405 may further include information about an anchor cell. Alternatively, the information about selection of the target cell set may further include an ID of a recommended anchor cell. The target cell deciding unit 405 is further configured to decide the anchor cell and other target cell than the anchor cell in the target cell set according to the ID of the recommended anchor cell, signal measurement information of the cell, and resource occupancy of the selected cell set.

Figure 5:
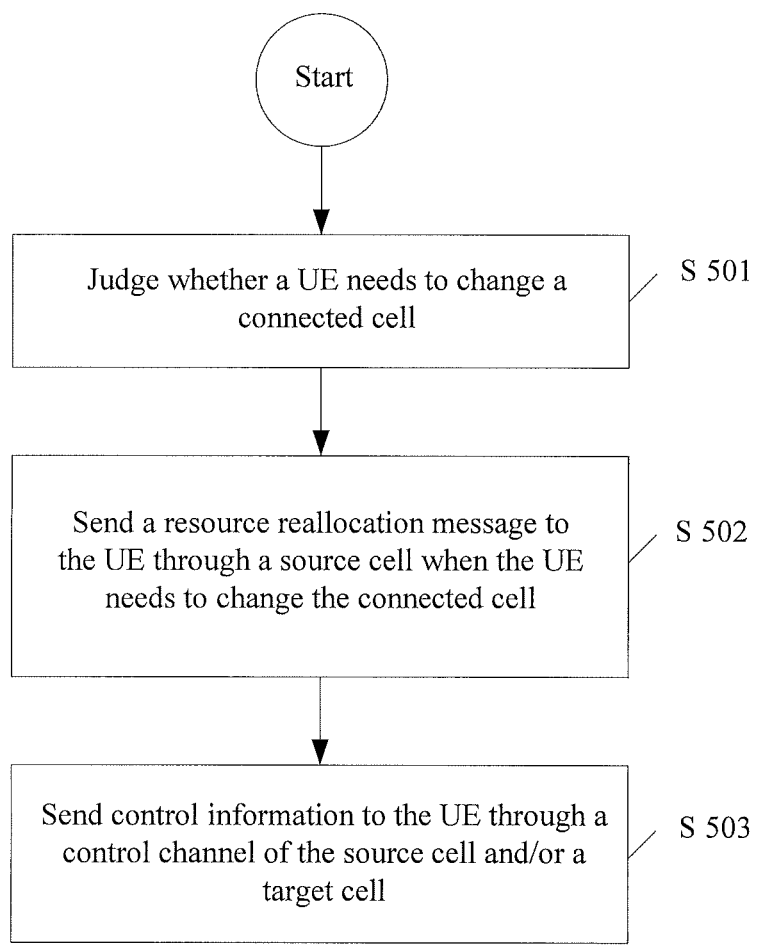
FIG. 5 is a flowchart of a method for mobility management inside a cell set in an embodiment of the present invention.

Further, a method and an apparatus for mobility management inside a cell set are provided in an embodiment of the present invention. The method is applicable when the anchor cell needs to be changed inside a cell set. FIG. 5 is a flowchart of a method for mobility management inside a cell set in an embodiment of the present invention. As shown in FIG. 5, the method includes the following steps:

Step S501: Judge whether a UE needs to change a connected cell according to radio resource conditions of an access network or cell signal measurement information from the UE.

Step S502: Send a resource reallocation message that carries information about a target cell to the UE through a source cell when the UE needs to change the connected cell.

Step S503: Send control information to the UE through a control channel of the source cell and/or the target cell after sending the resource reallocation message.

Specifically, step S503 falls into the following scenarios:

1) Send control information to the UE through the control channel of the target cell and keep sending control information to the UE through the control channel of the source cell after sending the resource reallocation message; and stop sending control information to the UE through the control channel of the source cell when a resource reallocation completion message from the UE is received;

2) Send control information to the UE through the control channel of the target cell and stop sending control information to the UE through the control channel of the source cell after sending the resource reallocation message; and 3) Keep sending control information to the UE through the control channel of the source cell after sending the resource reallocation message; and stop sending control information to the UE through the control channel of the source cell and send control information to the UE through the control channel of the target cell when a resource reallocation completion message from the UE is received.

Figure 6:
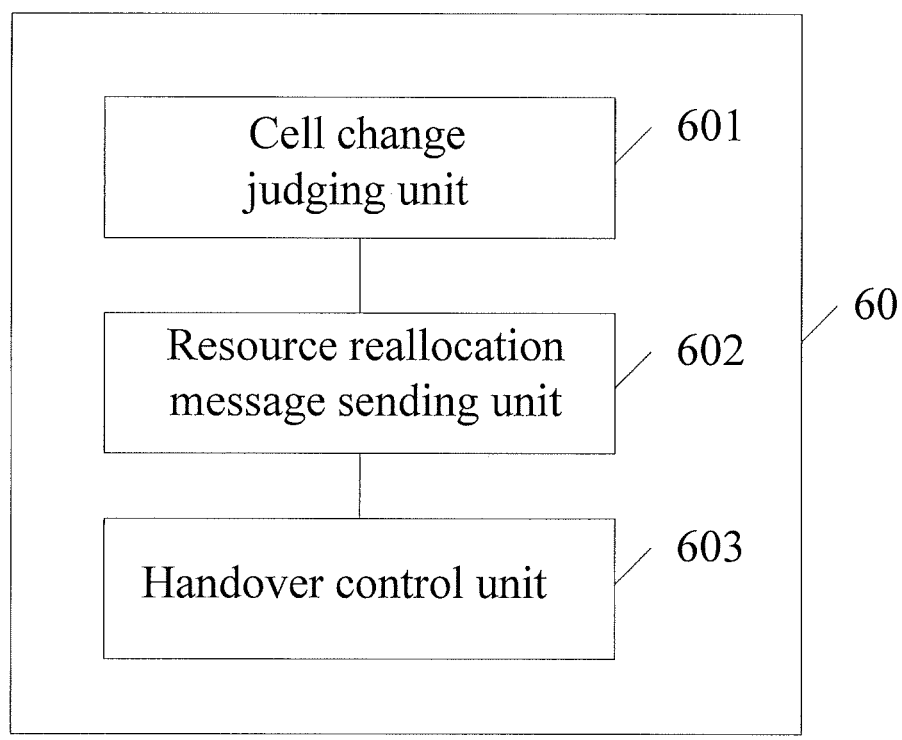
FIG. 6 is a block diagram of an apparatus for mobility management corresponding to FIG. 5.

FIG. 6 is a block diagram of an apparatus for mobility management corresponding to FIG. 5. The apparatus may be an access network node to which the cell set currently serving the UE belongs. As shown in FIG. 6, the apparatus for mobility management 60 includes: a cell change judging unit 601, configured to judge whether a UE needs to change a connected cell according to radio resource conditions of an access network or cell signal measurement information from the UE; a resource reallocation message sending unit 602, configured to send a resource reallocation message that carries information about a target cell to the UE through a source cell when the UE needs to change the connected cell; and a handover control unit 603, configured to send control information to the UE through a control channel of the source cell and/or the target cell after sending the resource reallocation message.

Specifically, the handover control unit 603 implements different handover control functions:

1) The handover control unit 603 is configured to send control information to the UE through the control channel of the target cell and keep sending control information to the UE through the control channel of the source cell after sending the resource reallocation message; and stop sending control information to the UE through the control channel of the source cell when a resource reallocation completion message from the UE is received; or 2) The handover control unit 603 is configured to send control information to the UE through the control channel of the target cell and stop sending control information to the UE through the control channel of the source cell after sending the resource reallocation message; or 3) The handover control unit 603 is configured to keep sending control information to the UE through the control channel of the source cell after sending the resource reallocation message; and stop sending control information to the UE through the control channel of the source cell and send control information to the UE through the control channel of the target cell when a resource reallocation completion message from the UE is received.

Figure 7:
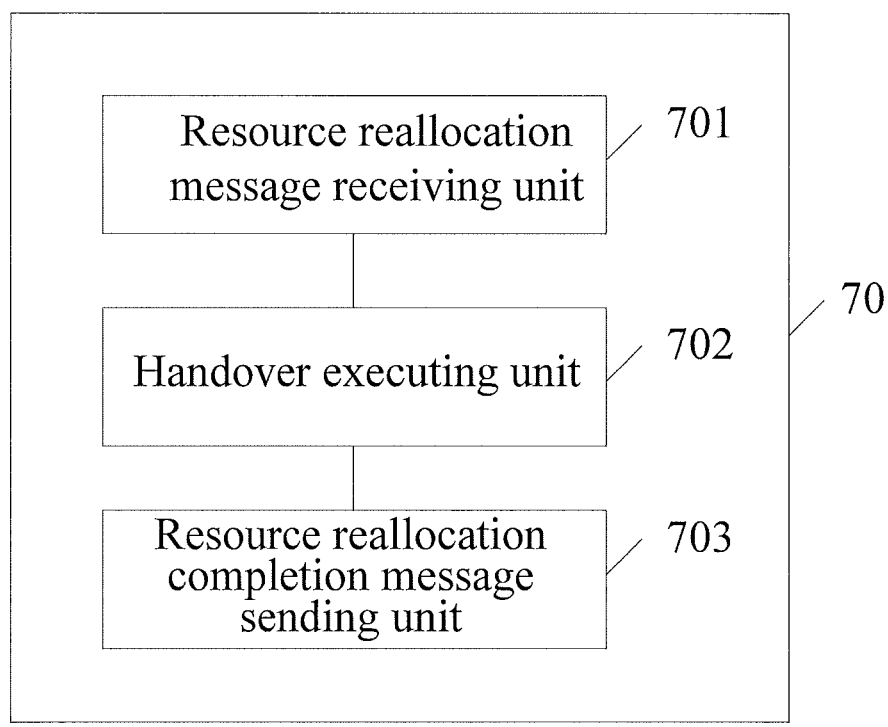
FIG. 7 is a schematic diagram of a UE in an embodiment of the present invention.

Further, a UE for mobility management inside a cell set is provided in an embodiment of the present invention. The UE is applicable when the anchor cell needs to be changed inside a cell set. FIG. 7 is a schematic diagram of a UE in an embodiment of the present invention. As shown in FIG. 7, the UE 70 includes: a resource reallocation message receiving unit 701, configured to receive a resource reallocation message that carries information about a target cell from a source cell; a handover executing unit 702, configured to stop receiving control information from a control channel of the source cell and receive control information from a control channel of the target cell after receiving the resource reallocation message from the source cell; and a resource reallocation completion message sending unit 703, configured to send a resource reallocation completion message to the target cell after resource reallocation is completed.

Figure 8:
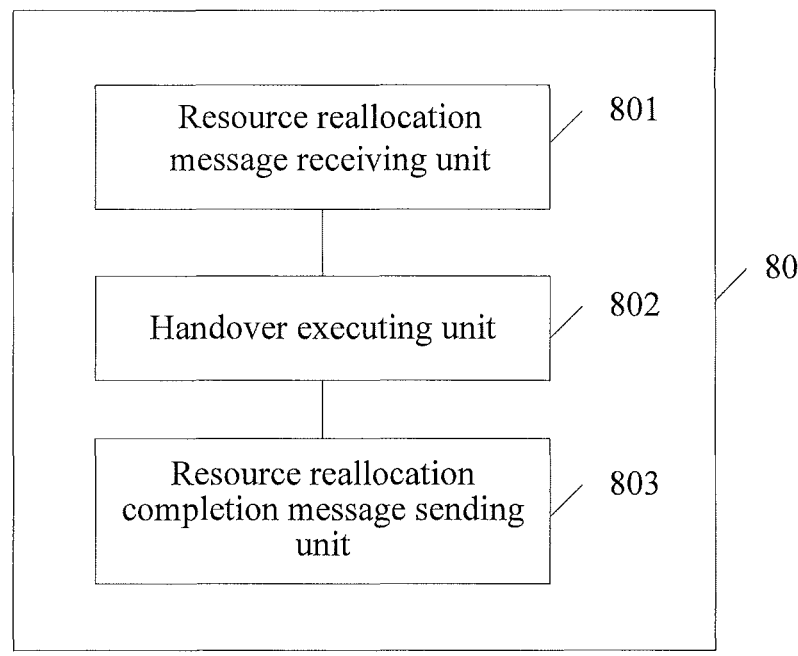
FIG. 8 is another schematic diagram of a UE in an embodiment of the present invention.

FIG. 8 is another schematic diagram of a UE in an embodiment of the present invention. As shown in FIG. 8, the UE 80 includes: a resource reallocation message receiving unit 801, configured to receive a resource reallocation message that carries information about a target cell from a source cell; a handover executing unit 802, configured to receive control information from a control channel of the target cell after receiving the resource reallocation message from the source cell, and stop receiving control information from a control channel of the source cell when control information from the target cell is received; and a resource reallocation completion message sending unit 803, configured to send a resource reallocation completion message to the target cell after resource reallocation is completed.

The following describes the mobility management signaling flow with reference to embodiments.

Embodiment 1

Figure 9:
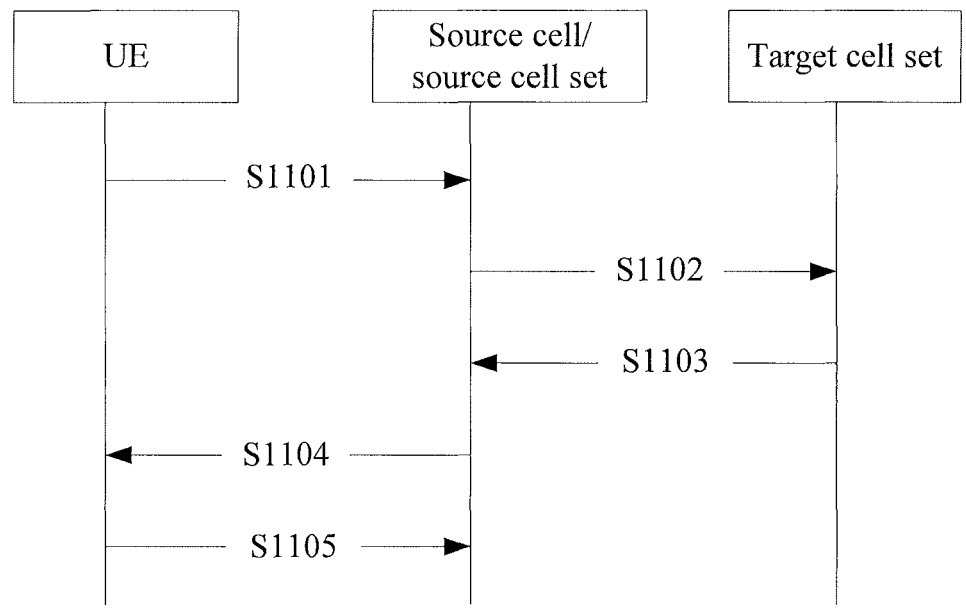
FIG. 9 is a signaling flowchart of a first embodiment of the present invention.

The method in this embodiment implements mobility management between cell sets. In this embodiment, a target cell set supports configuration of an anchor cell, and the selection of the anchor cell is recommended by a source cell and decided by the target cell set. FIG. 9 is a system signaling flowchart in a first embodiment of the present invention. As shown in FIG. 9, the method includes the following steps:

Step S1101: When a source cell or a source cell set receives a measurement report of the UE, or when the source cell or the source cell set initiates UE handover proactively due to resource deficiency, the source cell or the source cell set selects a target cell set to which the UE may hand over according to the cell set information, and optionally, according to cell measurement information.

Step S1102: After selecting the target cell set, the source cell or the source cell set needs to notify information about selection of the target cell set to the target cell set.

If the target cell set supports anchor cell configuration, and the anchor cell is decided by the source cell or the source cell set, the source cell or the source cell set needs to notify the following information about selection to the target cell set:

i. an ID of the target cell set, which may be specific to a cell (in the case that the cell sets are generated by the access network according to resource conditions), or specific to a UE (in the case that the cell sets are assigned according to service conditions of the UE);

ii. an ID of a recommended anchor cell; and iii. IDs of other cells, and optionally, measurement information of other cells, where the measurement information may be specific measurement values, a level of the measurement value, a reference measurement value, or a result of sorted measurement values; and other cells refer to all or part of cells other than the anchor cell in the anchor set, and the selection of other cells may be based on measurement reports of the UE.

Step S1103: After receiving the information about selection, the target cell set decides an anchor cell according to resources of the cell set and the recommended anchor cell, and allocates an ID and handover resources to the UE, in which the handover resources includes access resources or an antenna port configuration indication. Optionally, the target cell set feeds back information about other cell than the anchor cell to the UE.

When the component cells in the target cell set belong to different access network nodes, the access network nodes to which the cells of the target cell set belong decide the anchor cell together. If an access network node to which the recommended anchor cell belongs is competent as an anchor cell, this access network node is used as an anchor cell, and an ID and handover resources are allocated to the UE; if the access network node to which the recommended anchor cell belongs is not competent as an anchor cell, the access network nodes to which other cells indicated in the information about selection belong decide the anchor cell together.

After deciding the anchor cell, the target cell set feeds back information about the anchor cell to the UE through the source cell. Optionally, the target cell set feeds back information about other cell than the anchor cell to the UE.

Step S1104: After receiving the information about the anchor cell (and optionally, information about other target cell available to the UE) from the target cell set, the source cell or the source cell set sends a handover command to the UE. The handover command includes the information about the anchor cell, and optionally, the information about other target cell available to the UE.

Step S1105: After receiving the handover command, the UE accesses the target cell set through a configured anchor cell. If the access on the anchor cell fails or suffers any exception, the UE may access the target cell set through another cell specified in the handover command. After the access succeeds, the UE sends a handover completion message to the target cell set.

Embodiment 2

Figure 10:
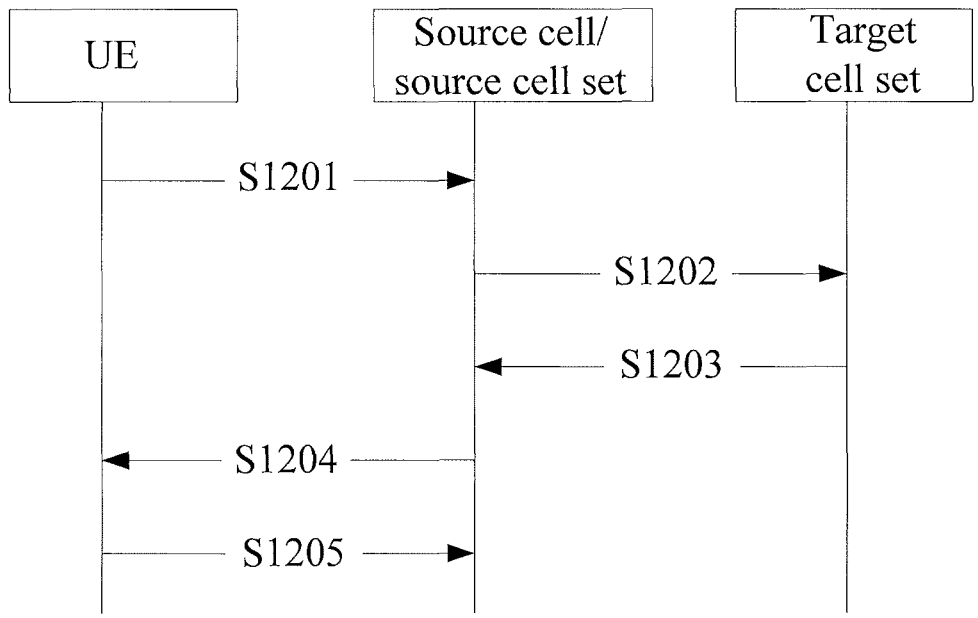
FIG. 10 is a signaling flowchart of a second embodiment of the present invention.

The method in this embodiment implements mobility management between cell sets. In this embodiment, a target cell set supports configuration of an anchor cell, the selection of an anchor cell is decided by the target cell, and a source cell does not need to provide the ID of the anchor cell. FIG. 10 is a signaling flowchart of a second embodiment of the present invention. As shown in FIG. 10, the method includes the following steps:

Step S1201: When a source cell or a source cell set receives a measurement report of the UE, or when the source cell or the source cell set initiates UE handover proactively due to resource deficiency, the source cell or the source cell set selects a target cell set to which the UE may hand over according to the cell set information, and optionally, according to a measurement result.

Step S1202: After selecting the target cell set, the source cell or the source cell set needs to notify information about selection of the target cell set to the target cell set.

If the target cell set supports anchor cell configuration, and the anchor cell is decided by the target cell set, the source cell or the source cell set needs to notify the following information about selection to the target cell set:

i. an ID of the target cell set, which is specific to a cell or UE;

ii. Ds of all or part of cells in the target cell set, where the selection of the cells may be based on measurement reports of the UE; and iii. optionally, measurement results of cells, where the measurement results may be specific measurement values, a level of the measurement value, a reference measurement value, or a result of sorted measurement values.

Step S1203: After receiving the information about selection from the source cell or the source cell set, the target cell set decides the anchor cell according to resources of the cell set and the result of the UE measuring signals of the cell, and allocates an ID and handover resources to the UE, the handover resources including access resources or antenna port configuration indication. Optionally, the target cell set feeds back information about other cell than the anchor cell to the UE.

When the component cells in the target cell set belong to different access network nodes, the access network nodes to which the cells of the target cell set belong decide the anchor cell together.

After deciding the anchor cell, the target cell set feeds back information about the anchor cell to the source cell. Optionally, the target cell set feeds back information about other cell than the anchor cell to the UE.

Step S1204: After receiving the information about the anchor cell (and optionally, information about other target cell available to the UE) from the target cell set, the source cell or the source cell set sends a handover command to the UE. The handover command includes the information about the anchor cell, and optionally, the information about other target cell available to the UE.

Step S1205: After receiving the handover command, the UE accesses the target cell set through the configured anchor cell. If the access on the anchor cell fails or suffers any exception, the UE may access the target cell set through another target cell specified in the handover command. After the access succeeds, the UE sends a handover completion message to the target cell set.

Embodiment 3

Figure 11:
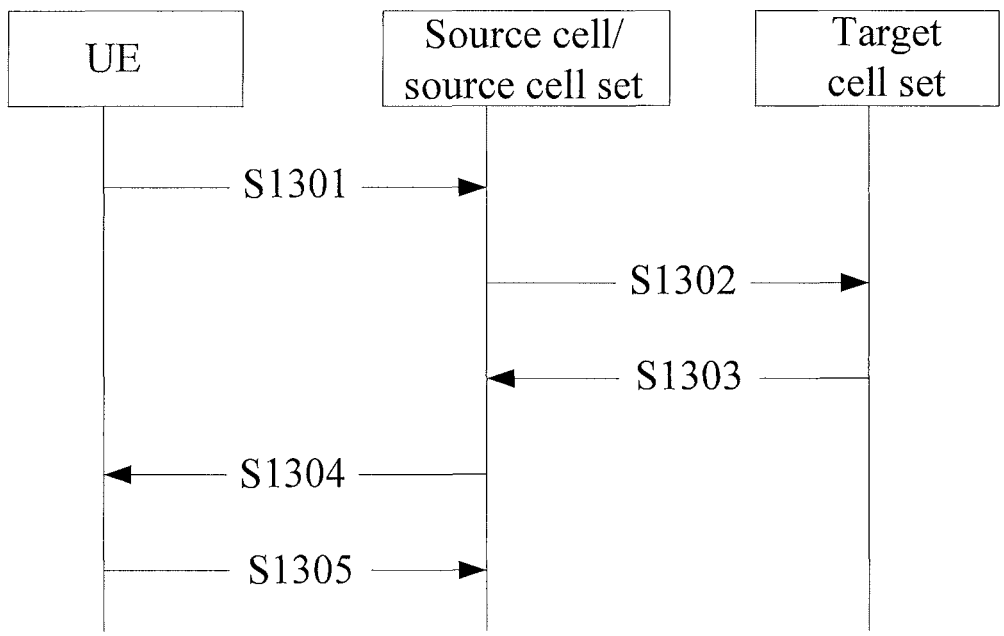
FIG. 11 is a signaling flowchart of a third embodiment of the present invention.

The method in this embodiment implements mobility management between cell sets. The target cell set in this embodiment does not support configuration of the anchor cell. FIG. 11 is a signaling flowchart of a third embodiment of the present invention. As shown in FIG. 11, the method includes the following steps:

Step S1301: When a source cell or a source cell set receives a measurement report of the UE, or when the source cell or the source cell set initiates UE handover proactively due to resource deficiency, the source cell or the source cell set selects a target cell set to which the UE may hand over according to the cell set information, and optionally, according to a measurement result.

Step S1302: After selecting the target cell set, the source cell or the source cell set needs to notify information about selection of the target cell set to the target cell set.

If the target cell set does not support anchor cell configuration, the source cell or the source cell set needs to notify the following information about selection to the target cell set:

i. an ID of the target cell set;

ii. IDs of all or part of cells in the target cell set, where the selection of the cells may be based on measurement reports of the UE; and iii. optionally, measurement results of cells, where the measurement results may be specific measurement values, a level of the measurement value, a reference measurement value, or a result of sorted measurement values.

Step S1303: After receiving the information about selection from the source cell or the source cell set, the target cell set decides the IDs of one or more target cells available to the UE according to resources of the cell set and the result of measuring signals of the cell, and allocates an ID and handover resources to the UE, the handover resources including access resources or antenna port configuration indication.

Step S1304: After receiving the information about the one or more target cells available to the UE from the target cell set, the source cell or the source cell set sends a handover command to the UE. The handover command includes the information about the target cells available to the UE.

Step S1305: After receiving the handover command, the UE accesses the target cell set through any target cell, or through the cell with the best signal quality. If the access on a cell fails or suffers any exception, the UE may access the target cell set through another target cell specified in the handover command. After the access succeeds, the UE sends a handover completion message to the target cell set.

Embodiment 4

Figure 12:
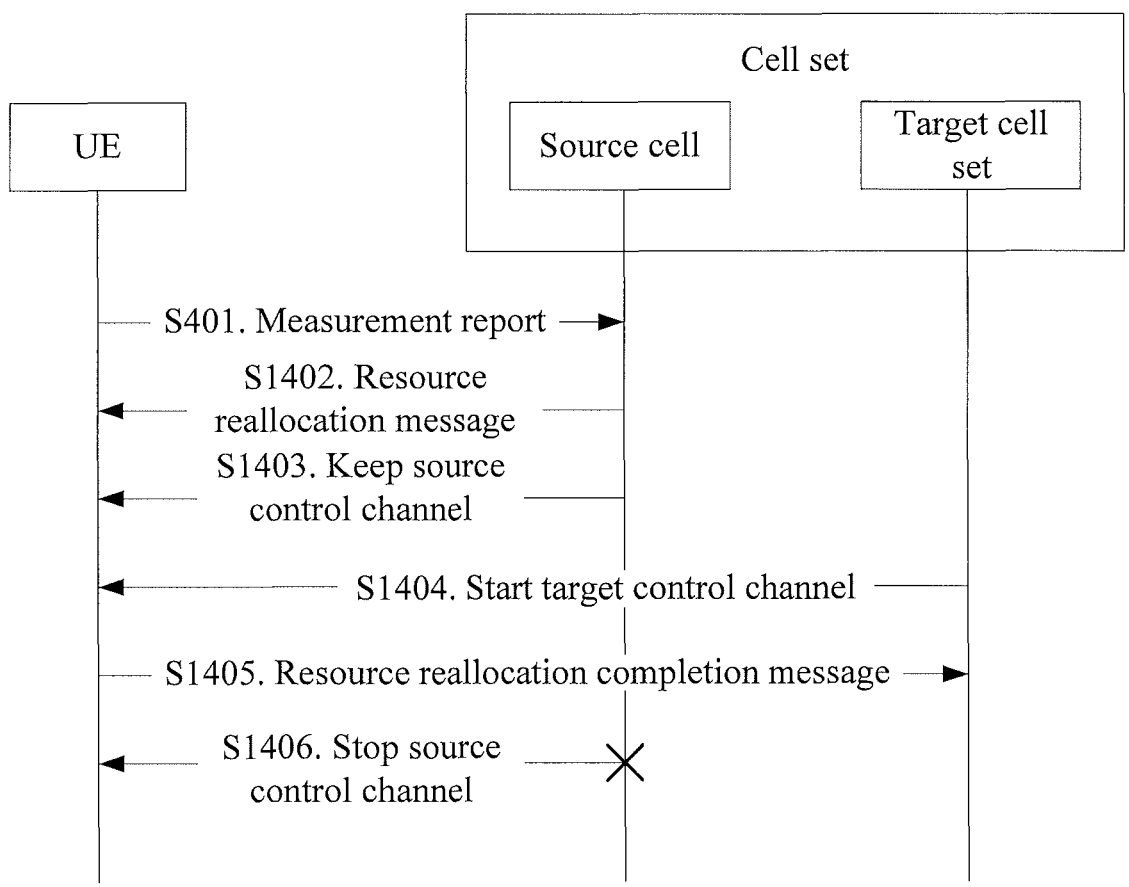
FIG. 12 is a signaling flowchart of a fourth embodiment of the present invention.

The method in this embodiment implements mobility management inside a cell set, and facilitates handover on an anchor cell that provides control information. In the mobility management process in this embodiment, a source cell and a target cell send a control channel message to a UE simultaneously, and the source cell stops sending the control channel message when a resource reallocation completion message from the UE is received. FIG. 12 is a signaling flowchart of a fourth embodiment of the present invention. As shown in FIG. 12, the method includes the following steps:

Step S1401: A current serving cell set receives a measurement report from the UE, or determines that the UE needs to change a cell due to Radio Resource Management (RRM).

Step S1402: The cell set sends a resource reallocation message to the UE through the source cell. The resource reallocation message includes: an ID of the target cell (a physical ID, higher-layer ID, or both), a UE ID, and frequency information.

Step S1403: After sending the resource reallocation message, the cell set keeps sending control information to the UE through the control channel of the source cell.

Step S1404: The cell set sends control information to the UE through the control channel of the target cell after sending the resource reallocation message; and the UE stops receiving control information on the control channel of the source cell and receives control information on the control channel of the target cell when the UE receives the resource reallocation message.

Step S1405: The UE sends a resource reallocation completion message to the cell set when the UE completes resource reallocation.

Step S1406: The cell set stops sending control information to the UE through the control channel of the source cell when the cell set receives the resource reallocation completion message from the UE.

Embodiment 5

Figure 13:
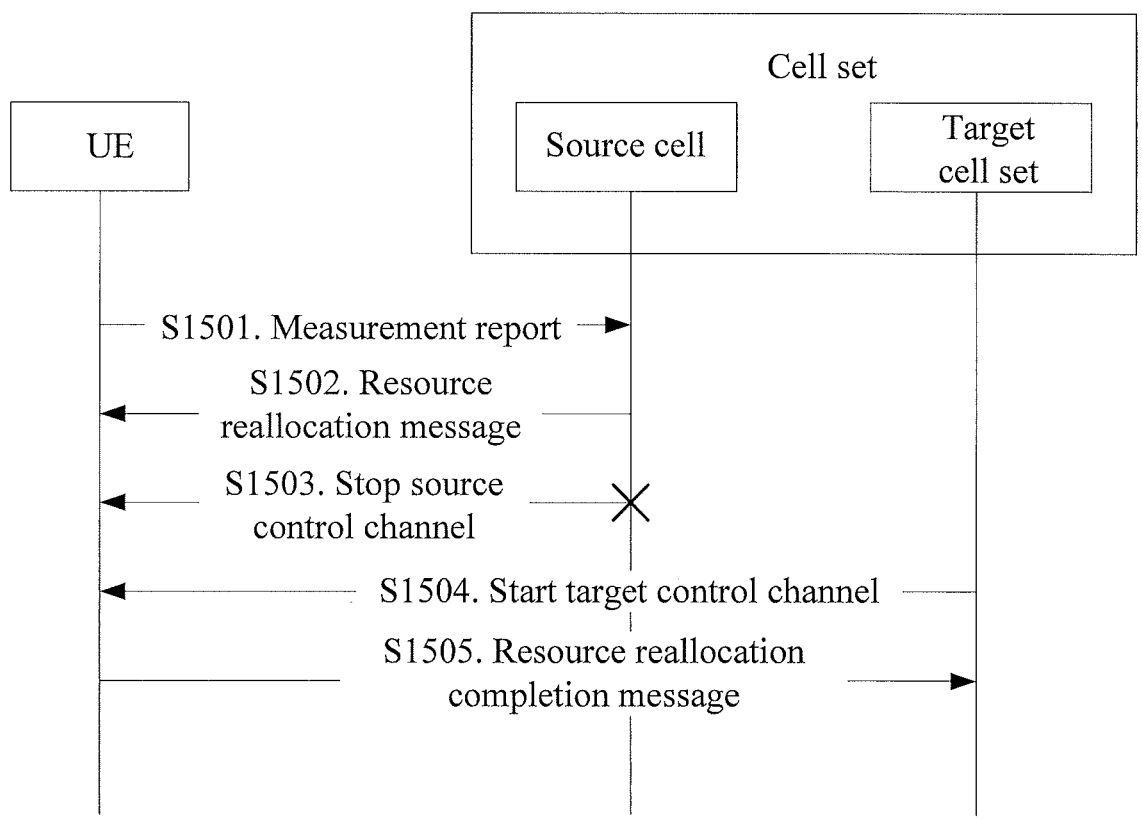
FIG. 13 is a signaling flowchart of a fifth embodiment of the present invention.

The method in this embodiment implements mobility management inside a cell set, and facilitates handover on an anchor cell that provides control information. In the mobility management process in this embodiment, a cell set stops sending control information to the UE from a source cell and sends control information to the UE from a target cell after the source cell sends a resource configuration message. FIG. 13 is a signaling flowchart of a fifth embodiment of the present invention. As shown in FIG. 13, the method includes the following steps:

Step S1501: A cell set receives a measurement report from a UE, or determines that the UE needs to change a cell due to RRM.

Step S1502: The cell set sends a resource reallocation message to the UE through a source cell. The resource reallocation message includes: an ID of the target cell (a physical ID, a higher-layer ID, or both), a UE ID, and frequency information.

Step S1503: After sending the resource reallocation message, the cell set stops sending control information through the control channel of the source cell.

Step S1504: After sending the resource reallocation message, the cell set sends control information through the control channel of the target cell. The UE stops receiving control information from the control channel of the source cell and receives control information from the control channel of the target cell after the UE receives the resource reallocation message.

Step S1505: The UE sends a resource reallocation completion message to the cell set when the UE completes resource reallocation.

Embodiment 6

Figure 14:
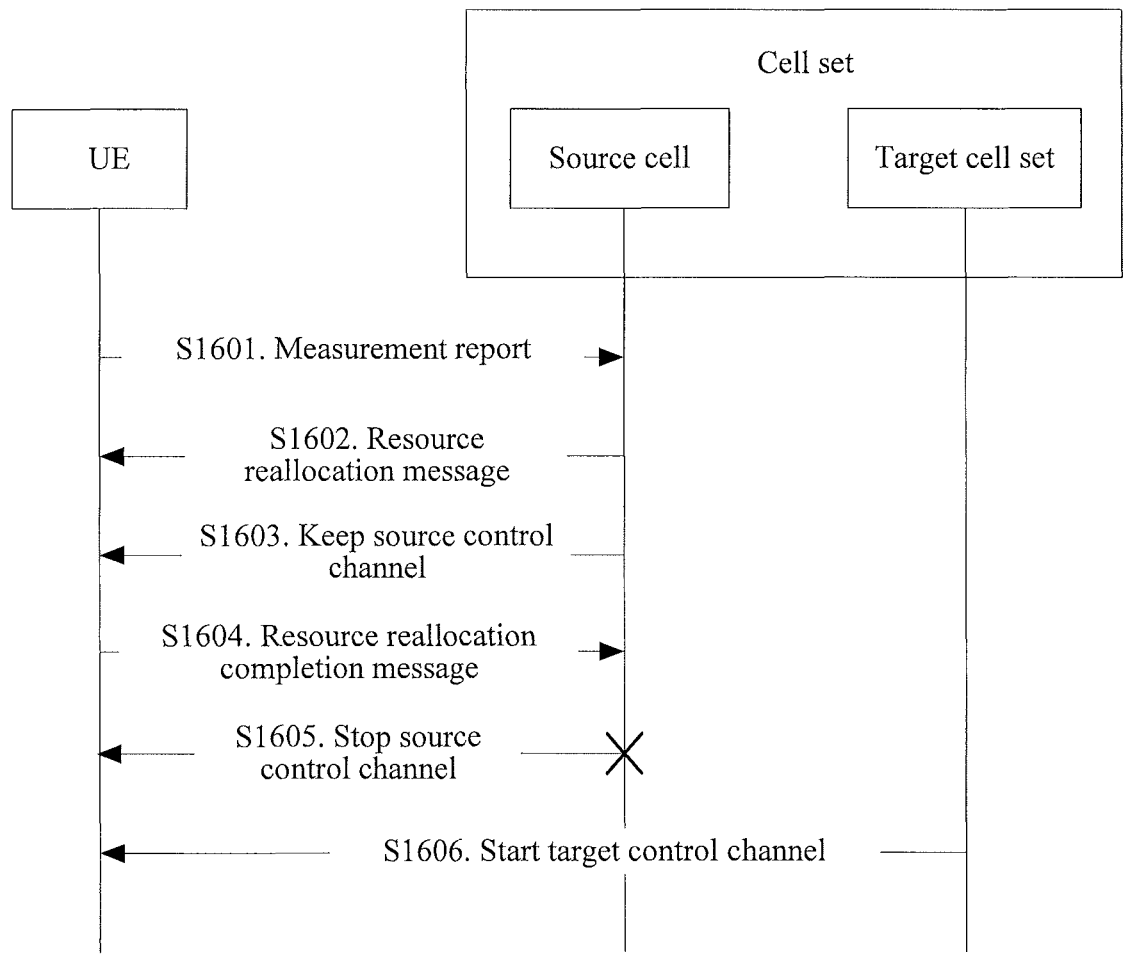
FIG. 14 is a signaling flowchart of a sixth embodiment of the present invention.

The method in this embodiment implements mobility management inside a cell set, and facilitates handover on an anchor cell that provides control information. In the mobility management process in this embodiment, a cell set stops sending control information to a UE from a source cell and sends control information to the UE through the control channel of the target cell after receiving the resource configuration completion message. FIG. 14 is a signaling flowchart of a sixth embodiment of the present invention. As shown in FIG. 14, the method includes the following steps:

Step S1601: A cell set receives a measurement report from the UE, or determines that the UE needs to change a cell due to RRM.

Step S1602: The cell set sends a resource reallocation message to the UE through the source cell. The resource reallocation message includes: an ID of the target cell (a physical ID and/or higher-layer ID), a UE ID, and frequency information.

Step S1603: After sending the resource reallocation message, the cell set keeps sending control information to the UE through the control channel of the source cell.

Step S1604: The UE performs resource reallocation after the UE receives a resource reallocation message, and sends a resource reallocation completion message to the cell set when the UE completes resource reallocation.

Step S1605: The cell set stops sending control information to the UE from the source cell when the cell set receives the resource reallocation completion message from the UE.

Step S1606: The cell set sends control information to the UE through the control channel of the target cell after the cell set receives the resource reallocation completion message from the UE. The UE stops receiving control information through the control channel of the source anchor cell automatically when the cell set receives the control information on the control channel of the target cell.

The method for mobility management between cell sets in the embodiments of the present invention enables handover between cell sets, enables the UE to hand over to the target cell set, and better supports services of the UE, especially high-speed services. In the method for mobility management disclosed herein, an anchor cell of the target cell set may be selected for controlling handover, which simplifies the handover that involves multiple cells simultaneously.

The method for mobility management inside a cell set in the embodiments of the present invention implements handover of the anchor cell, simplifies mobility processing inside the cell set, reduces interruption time of UE handover, improves reliability of receiving signaling, and improves performance of the communication system.

In an embodiment of the present invention, a method for mobility management is provided, the method comprises:

judging whether a user equipment needs to change a connected cell according to radio resource conditions of an access network or cell signal measurement information from the user equipment;

sending a resource reallocation message that carries information about a target cell to the user equipment through a source cell when the user equipment needs to change the connected cell; and sending control information to the user equipment through a control channel of the source cell and/or the target cell after sending the resource reallocation message.

In the method, the sending control information to the user equipment through a control channel of the source cell and/or the target cell after sending the resource reallocation message comprises:

sending control information to the user equipment through the control channel of the target cell and keeping sending control information to the user equipment through the control channel of the source cell after sending the resource reallocation message; and stopping sending control information to the user equipment through the control channel of the source cell when a resource reallocation completion message from the user equipment is received;

or, sending control information to the user equipment through the control channel of the target cell and stopping sending control information to the user equipment through the control channel of the source cell after sending the resource reallocation message;

or, keeping sending control information to the user equipment through the control channel of the source cell after sending the resource reallocation message; and stopping sending control information to the user equipment through the control channel of the source cell and sending control information to the user equipment through the control channel of the target cell when a resource reallocation completion message from the user equipment is received.

In an embodiment of the present invention, an apparatus for mobility management is provided, the apparatus comprises:

a cell change judging unit, configured to judge whether a user equipment needs to change a connected cell according to radio resource conditions of an access network or cell signal measurement information from the user equipment;

a resource reallocation message sending unit, configured to send a resource reallocation message that carries information about a target cell to the user equipment through a source cell when the user equipment needs to change the connected cell; and a handover control unit, configured to send control information to the user equipment through a control channel of the source cell and/or the target cell after sending the resource reallocation message.

In the apparatus, the handover control unit is configured to: send control information to the user equipment through the control channel of the target cell and keep sending control information to the user equipment through the control channel of the source cell after sending the resource reallocation message; and stop sending control information to the user equipment through the control channel of the source cell when a resource reallocation completion message from the user equipment is received;

or, the handover control unit is configured to send control information to the user equipment through the control channel of the target cell and stop sending control information to the user equipment through the control channel of the source cell after sending the resource reallocation message;

or, the handover control unit is configured to keep sending control information to the user equipment through the control channel of the source cell after sending the resource reallocation message; and stop sending control information to the user equipment through the control channel of the source cell and send control information to the user equipment through the control channel of the target cell when a resource reallocation completion message from the user equipment is received.

In an embodiment of the present invention, a user equipment is provided, the user equipment comprises:

a resource reallocation message receiving unit, configured to receive a resource reallocation message that carries information about a target cell from a source cell;

a handover executing unit, configured to stop receiving control information from a control channel of the source cell and receive control information from a control channel of the target cell after receiving the resource reallocation message from the source cell; and a resource reallocation completion message sending unit, configured to send a resource reallocation completion message to the target cell after resource reallocation is completed.

In an embodiment of the present invention, a user equipment is provided, the user equipment comprises:

a resource reallocation message receiving unit, configured to receive a resource reallocation message that carries information about a target cell from a source cell;

a handover executing unit, configured to receive control information from a control channel of the target cell after receiving the resource reallocation message from the source cell, and stop receiving control information from a control channel of the source cell when control information from the target cell is received; and a resource reallocation completion message sending unit, configured to send a resource reallocation completion message to the target cell after resource reallocation is completed.

The above embodiments are provided for merely describing the technical solutions of the present invention, but not intended to limit the present invention.

What is claimed is:

1. A method for mobility management, comprising:

transmitting, by a terminal, a measurement report of the terminal to a source access network node, wherein the measurement report of the terminal is used for selection of a target access network node the terminal may handover;

receiving, by the terminal from the target access network node via the source access network node, information about at least two target cells served by the target access network node for handover, wherein the at least two target cells comprise an anchor cell and at least one target cell other than the anchor cell;

accessing, by the terminal, the target access network node via the anchor cell; and after handover, performing data communication by using carrier aggregation, by the terminal, with the at least two target cells, wherein the data communication is scheduled by signaling, and wherein performing the data communication comprises:

after handover, performing uplink data communication using carrier aggregation with the at least two target cells, or after handover, performing downlink data communication using carrier aggregation with the at least two target cells, or after handover, performing uplink and downlink data communication using carrier aggregation with the at least two target cells;

wherein the method further comprises:

obtaining, by the source access network node, cell set information from each of a plurality of cell sets in an access network, each cell set including at least two cells able to simultaneously intercommunicate with a same terminal;

selecting, by the source access network node, one of the plurality of cell sets as a target cell set for handover by the terminal communicatively connected to the source access network node in accordance with the cell set information;

sending, by the source access network node, information to the target access network node that manages the target cell set, the information indicating that the target cell set is the selected cell set;

receiving, by the source access network node, information about the at least two target cells in the target cell set, the at least two target cells determined by the target access network node; and providing, by the source access network node, the information about the at least two target cells to the terminal for handover.

2. The method according to claim 1, wherein the measurement report of the terminal comprises measurement results of the at least two target cells.

3. The method according to claim 1, wherein the at least two target cells are on different component carriers.

4. The method according to claim 3, wherein the different component carriers correspond to different frequencies.

5. The method according to claim 1,
wherein the information indicating that the target cell set is the selected cell set comprises an identifier of the target cell set; and
wherein the information from the source access network node to the target access network node further comprises identifiers of all or part of cells in the target cell set.

6. The method according to claim 1, wherein the information from the source access network node to the target access network node further comprises an identifier of a recommended anchor cell.

7. The method according to claim 1, wherein the information from the source access network node to the target access network node further comprises cell signal measurement information.

8. The method according to claim 1, further comprising:
receiving, by the source access network node, the cell signal measurement information from the terminal;
wherein selecting, by the source access network node, the one of the plurality of cell sets as the target cell set for handover by the terminal is based on the cell set information and the cell signal measurement information received from the terminal.

9. A communications system, comprising a source access network node and a terminal;
wherein the terminal is configured to:
transmit a measurement report of the terminal to the source access network node, wherein the measurement report of the terminal is used for selection of a target access network node the terminal may handover;
receive, from the target access network node via the source access network node, information about at least two target cells served by the target access network node for handover, wherein the at least two target cells comprise an anchor cell and at least one target cell other than the anchor cell;
access the target access network node via the anchor cell; and
after handover, perform data communication by using carrier aggregation with the at least two target cells, wherein the data communication is scheduled by signaling, and wherein performing the data communication comprises:
after handover, performing uplink data communication using carrier aggregation with the at least two target cells, or
after handover, performing downlink data communication using carrier aggregation with the at least two target cells, or
after handover, performing uplink and downlink data communication using carrier aggregation with the at least two target cells; and
wherein the source access network node is configured to:
obtain cell set information from each of a plurality of cell sets in an access network, each cell set including at least two cells able to simultaneously intercommunicate with a same terminal;
select one of the plurality of cell sets as a target cell set for handover by the terminal communicatively connected to the source access network node in accordance with the cell set information;
send information to the target access network node that manages the target cell set, the information indicating that the target cell set is the selected cell set;
receive information about the at least two target cells in the target cell set, the at least two target cells determined by the target access network node; and
provide the information about the at least two target cells to the terminal for handover.

10. The communications system according to claim 9, wherein the measurement report of the terminal comprises measurement results of the at least two target cells.

11. The communications system according to claim 9, wherein the at least two target cells are on different component carriers.

12. The communications system according to claim 11, wherein the different component carriers correspond to different frequencies.

13. The communications system according to claim 9, wherein the at least two target cells correspond to different frequencies.

14. The communications system according to claim 9,
wherein the information indicating that the target cell set is the selected cell set comprises an identifier of the target cell set; and
wherein the information from the source access network node to the target access network node further comprises identifiers of all or part of cells in the target cell set.

15. The communications system according to claim 9, wherein the information from the source access network node to the target access network node further comprises an identifier of a recommended anchor cell.

16. The communications system according to claim 9, wherein the information from the source access network node to the target access network node further comprises cell signal measurement information.

17. The communications system according to claim 9, wherein the source access network node is further configured to:
receive the cell signal measurement information from the terminal;
wherein to select the one of the plurality of cell sets as the target cell set for handover by the terminal is based on the cell set information and the cell signal measurement information received from the terminal.

18. The communications system according to claim 9, further comprising the target access network node, wherein the target access network node manages a first cell set in an access network, and wherein the target access network node is configured to:
send cell set information of the first cell set to the source access network node, wherein the source access network node manages a source cell set, wherein the source access network node also receives additional cell set information from an additional access network node that manages an additional cell set in the access network, wherein each of the first cell set, the source cell set, and the additional cell set includes at least two cells able to simultaneously intercommunicate with a same terminal;
receive information from the source access network node, the information indicating that the first cell set managed by the target access network node is the target cell set for handover by the terminal communicatively connected to the source access network node, wherein the first cell set is selected by the source access network node as the target cell set over the additional cell set in accordance with the cell set information;

determine the at least two target cells in the first cell set managed by the target access network node; and send the information about the at least two target cells to the source access network node for handover by the terminal.

19. A method for mobility management, comprising:

transmitting, by a terminal, a measurement report of the terminal to a source access network node, wherein the measurement report of the terminal is used for selection of a target access network node the terminal may handover;

receiving, by the terminal from the target access network node via the source access network node, information about at least two target cells served by the target access network node for handover, wherein the at least two target cells comprise an anchor cell and at least one target cell other than the anchor cell;

accessing, by the terminal, the target access network node via the anchor cell; and after handover, performing data communication by using carrier aggregation, by the terminal, with the at least two target cells, wherein the data communication is scheduled by signaling, and wherein performing the data communication comprises:

after handover, performing uplink data communication using carrier aggregation with the at least two target cells, or after handover, performing downlink data communication using carrier aggregation with the at least two target cells, or after handover, performing uplink and downlink data communication using carrier aggregation with the at least two target cells;

wherein the method further comprises:

sending, by the target access network node managing a cell set in an access network, cell set information to the source access network node managing a source cell set, the source access network node also receiving cell set information from an additional access network node managing an additional cell set in the access network, each cell set including at least two cells able to simultaneously intercommunicate with a same terminal;

receiving, by the target access network node, information from the source access network node, the information indicating that the cell set managed by the target access network node is a target cell set for handover by the terminal communicatively connected to the source access network node, wherein the cell set is selected by the source access network node as the target cell set over the additional cell set in accordance with the cell set information;

determining, by the target access network node, the at least two target cells in the target cell set managed by the target access network node; and sending, by the target access network node, the information about the at least two target cells to the source access network node for handover by the terminal.

* * * * *